United States Patent

Henderson

[15] 3,681,528
[45] Aug. 1, 1972

[54] HARMONIC INFORMATION DETECTION TECHNIQUE

[72] Inventor: Charles R. Henderson, Arlington, Tex.

[73] Assignee: LTV Aerospace Corporation, Dallas Tex.

[22] Filed: Dec. 21, 1970

[21] Appl. No.: 99,888

[52] U.S. Cl.............................178/6.8, 178/DIG. 21
[51] Int. Cl................................................H04n 3/32
[58] Field of Search........................178/6.8, DIG. 21

[56] References Cited

UNITED STATES PATENTS 3,114,859  12/1963  Fathauer et al........178/DIG. 21

*Primary Examiner*—Robert L. Griffin
*Assistant Examiner*—Richard K. Eckert, Jr.
*Attorney*—H. C. Goldwire and James M. Cate

[57] ABSTRACT

An optical tracking system wherein a first control means tends to lock a nutation electron beam upon and within the image of a target which has been projected upon a screen and constitutes a dark body upon a light background. A second control means functions to expand the nutating scanning pattern of the electron beam until it cuts across the light background in at least two different places to generate a signal whose frequency is equal to the second harmonic of the nutating scanning pattern. Said second control means maintains the amplitude of this second harmonic within certain limits to thereby insure that the scanning pattern always remains approximately the same size as the target.

Other logic means are provided to cause the nutating scanning pattern to find and lock-on upon the target should the target suddenly reflect the sun and become a bright object upon a dark background.

8 Claims, 16 Drawing Figures

CHARLES R. HENDERSON
INVENTOR $$F_{4X} + F_{5X} + F_{6X} + F_{7X} = 0$$
$$F_{4Y} + F_{5Y} + F_{6Y} + F_{7Y} = 0$$

$$F_{8X} + F_{9X} + F_{10X} + F_{11X} + F_{12X} = 0$$
$$F_{8Y} + F_{9Y} + F_{10Y} + F_{11Y} + F_{12Y} = 0$$
$$\int E \sin 2\omega_n t = K = V_{ref}$$

CHARLES R. HENDERSON
INVENTOR

HARMONIC INFORMATION DETECTION TECHNIQUE

This invention relates generally to systems for detecting and tracking moving objects and more particularly to a system for detecting and tracking moving objects by means of a nutating beam.

Many different systems have been developed for detecting and tracking moving objects. Some of these systems employ radar means, others, such as the well known sidewinder air-to-air attack missile, employ heat detecting means, and some employ optical means. One of the systems employing optical means projects the image of the target upon the screen of an image reproducing tube, such as a vidicon tube. Viewing means are provided whereby the operator of the intercepting aircraft is able to view the image of the target. Still other means are provided for generating a nutating electron beam which can be slewed upon the target image by the operator. The radius of nutation is controllable by the operator so that it is smaller than the body of the target, with the target body usually being darker than the background which ordinarily comprises sky and clouds.

The nutating scanning pattern of the electron beam will move freely about on the dark target body. However, as soon as the scanning pattern begins to move outside the target body, and cuts across a portion of the lighter background, a signal is generated which indicates that the scanning pattern has begun to move off the dark target body. More specifically, while on the dark target body the electron abeam will generate a low level signal, which can be comprised of secondary electron emission, but will generate a greater quantity of secondary electron emission and consequently a higher level signal when it impinges upon a light background.

Since the nutating pattern of the electron beam is generated by sine and cosine voltage functions supplied to the vertical and horizontal deflection windings of the electron beam the occurrence of the signal caused by the nutating beam cutting across the light background will bear a definite phase relation with said sine and cosine deflection voltages. Suitable phase comparing means are provided which compare the signal generated by the nutating beam cutting across the light background with the sine and cosine deflection voltages to produce d-c voltage of the appropriate magnitude. These d-c voltages are applied to the said vertical and horizontal deflection coils and are of appropriate magnitude to move the nutating scanning pattern back onto the dark body of the target.

As the intercepting aircraft approaches the target, however, the size of the target image becomes increasingly larger with respect to the size of nutating electron beam so that the scanning pattern will drift along the dark target body to some extreme portion thereof, such as for example, the tip of the tail or if the target has wings, perhaps to the tip of a wing. Since the intercepting missile will be directed to the center of the nutating scanning pattern it is apparent that the system would be much more likely to ensure destruction of the target if the nutating scanning pattern remained centered on a major portion of the target.

Another problem inherent in the foregoing prior art systems arises when the target body becomes brighter than the background, as for example when the rays from the sun reflect off the target towards the intercepting aircraft. Under such conditions the target body becomes brighter than the background and the nutating electron beam is literally forced off the target and onto the darker background where it moves aimlessly about or perhaps finds a dark cloud to lock upon. In either event the system has become ineffective and the target will escape.

It is a primary object of the present invention to provide an optical detecting and tracking system employing a nutating electron beam which is employed to scan a target image, and wherein the size of the scanning pattern changes in accordance with the size of the target image so that said scanning pattern will remain locked upon a major portion of the target image.

It is a second purpose of the invention to provide a means for detecting and tracking a target employing a nutating electron beam which scans the target image and has a scanning pattern of sufficient size so that it cuts into the light background in at least two separate places, and with the size of said scanning pattern increasing or decreasing as the size of the target image increases or decreases.

It is a third object of the invention to provide a detecting and tracking system employing a nutating electron beam which always scans a major portion of the target body.

A fourth aim of the invention is to provide a detecting and tracking system employing a nutating electron beam whose scanning pattern locks upon a dark target body and which will search for and relock upon said target image should said target suddenly become a bright object upon a dark background.

A fifth purpose of the invention is a detecting and tracking system employing a nutating electron beam which scans the target image and which is of sufficient size so that it will pass across the light background in at least two separate places; the size of said scanning pattern being maintained by detecting the second harmonic generated by the passage of the scanning pattern between the light and dark areas of the background and the target body.

A sixth object of the invention is the detecting and tracking of a target by means of a nutating electron beam which scans the optically reproduced target image and which is of a sufficient size to cut across at least two separate portions of the light background to thereby produce a signal output having a component whose frequency is equal to the second harmonic of the nutation frequency, and maintaining the magnitude of said second harmonic component above a predetermined value so that the size of said scanning pattern in turn will always be large enough to scan a major portion of the target.

It is a seventh object of the invention to provide a means for detecting and tracking a target employing a nutating electron beam whose size is automatically adjustable by appropriate control means to always cut across at least two portions of the light background surrounding the dark target, and which is also capable of performing a similar tracking function of a bright target upon a dark background in the event that the target should suddenly become brighter than the background, and further providing appropriate means for remembering the direction and the rate of speed of the target and also the size of the nutating electron beam scanning pattern during that time period in which the system is accommodating itself to track a light target upon a dark background rather than a dark background upon a light background.

An eighth object is the improvement of optical means for detecting and tracking a moving target, generally.

In accordance with the invention there is provided optical means for projecting an image of the target upon a photosensitive screen. Means are provided to generate a nutating electron beam which can be slewed upon the target image by the pilot of the intercepting aircraft and caused to remain locked thereupon by two interdependent control means. The first of these control means comprises means for generating high and low level signals in accordance with whether the electron beam is scanning the dark body of the target or the light background. A phase comparing means is provided to compare the phases of the sine and cosine functions of voltage signals employed to generate the nutating beam with the phases of the signals generated as the electron beam scans over any portion of the light background. Integrating means are responsive to the output of said phase comparing means to generate d-c voltages which are supplied back to the vertical and horizontal deflecting coils to deflect said nutating scanning pattern away from the light background area and back onto the dark body of the target.

The said second control means comprises a filter which detects a signal component generated by the nutating electron beam as it passes between the light and dark areas of background and target and whose frequency is equal to the second harmonic of the nutating frequency. Means are provided to rectify and integrate the said second harmonic component to produce d-c voltage. The said second control means further functions to compare the generated d-c voltage with a reference d-c voltage to produce a third d-c voltage of a polarity and magnitude which will cause the diameter of the nutating scanning pattern to increase or decrease to maintain the desired amplitude of said second harmonic component. Thus the size of the scanning pattern of the nutating electron beam is caused to be large enough to cut at least two separate portions of the light background. Consequently, the said scanning pattern of said nutating beam will very likely scan a major portion of said target rather than some small portion thereof, such as the wing tip or the end of the tail.

The effects of said first control means and said second control means are, to an extent, opposing effects. More specifically the effect of the said first control means is always to tend to move the nutating scanning pattern entirely back onto the dark body of the target, while the effect of the second control means is to expand said nutating scanning pattern until said scanning pattern cuts across two or more segments of the light background, and thereby generate a second harmonic component of a given magnitude, as described above.

In order to satisfy the requirements of both the first control means and the second control means the sum total of all of the d-c voltages generated by the scanning pattern cutting across the light background, and which are supplied back to the horizontal deflection coil, must be equal to zero. Similarly all of the d-c voltages generated as a result of the electron beam cutting across the light background, and which are supplied back to the vertical deflection coil, must be equal to zero. If all the d-c voltages supplied to the horizontal coil have a sum total of zero and all the d-c voltages supplied back to the vertical coil have a sum total of zero, then the position of the scanning pattern is stablized as far as the said first control means is concerned. The requirements of the second control means are also satisfied since the scanning pattern is of a size whereby it cuts across a sufficient amount of light background to generate the required second harmonic component.

The said second control means comprises a third control means, herein identified as a function control means. The said function control means performs two major functions, the first being to initiate operation of the system, including the initail lock-on of the nutating scanning pattern onto the target and the second being to recapture the target if a break-lock should occur, i.e. if for some reason the scanning pattern is caused to be dislocated from the target, as for example when the target passes through a cloud, or when the target suddenly becomes a bright object upon a dark background as occurs when it suddenly reflects the sun's image back to the image reproducing means.

In order to initiate operation of the system the function control means utilizes a signal generating means which causes the nutation pattern to assume a very small angular rotation, which function will be referred to herein as "nutation caging." Also during the initiation of operation of the system the function control means will energize an automatic-lock-on circuit (ALO circuit) which functions to generate sine and cosine function voltage signals, which initially have relatively large amplitudes and then rapidly degenerate to smaller amplitudes, thereby providing a collapsing spiral path for the caged nutating scanning pattern. The radius of the spiraling scan is much larger and its angular rotation much less, than the radius and angular rate of the nutating scanning pattern.

The second function of the function control means is a result of the occurrence of a break-lock. In the execution of said second function of the function control means will energize the ALO circuit but will not, however, cage the nutating electron beam. Rather the nutating electron beam will be reduced in size to about one-half of the diameter that it had when break-lock occurred. A rate memory means, which is constructed to retain a continuously updated record of the rate and direction of the target, is also energized by said function control means when break-lock occurs. Thus the general direction and rate of the spiral scanning pattern will move in the direction and at the rate of the target as last recorded.

Also, when break-lock occurs, the function control means will invert the sine and cosine function voltages supplied to the horizontal and vertical deflecting coils of the image tube, to thereby cause the scanning pattern to lock onto a bright target on a dark background. The reason for this change in the basic operation of the system is based on the assumption that break-lock occurred because the target suddenly caught the rays of the sun and thereby became a bright object upon a dark background.

During the aforementioned changes in the circuit that are effected when a break-lock occurs, the second control means is, in effect, disabled in that no changes in the circuit are made as a result of the existence or non-existence of a second harmonic produced by the electron beam as it passes over its scanning pattern. However, after a very short interval of time of sufficient duration to permit the aforementioned changes in the system to occur, the disabling of the second control means is terminated.

It is assumed that while the second control means is disabled the said first control means will have operated to recapture the target with the caged nutating electron beam. Then when the second control means is reenergized the scanning pattern will be caused to gradually increase in size until the requirements of both the first and the second control means are satisfied.

In accordance with a feature of the invention there is provided an automatic lock-on circuit which responds to a break-lock condition to provide a signal to the horizontal and vertical deflection coils of the image reproducing tube and thereby cause the caged nutating electron beam to follow a collapsing spiral scanning pattern. The mathematical expression for these aforementioned signals supplied from the automatic lock-on circuit to the horizontal and vertical deflection coils of the image reproducing tube are approximated by the following expressions:

$$e_{horizontal} = \sin X / X$$
$$e_{vertical} = \cos X / X$$

Where $X$ is the frequency function of the spiral scan and is much larger than $W_n t$ the nutation frequency function.

In accordance with a second feature of the invention there is provided gating logic which, upon the occurrence of a break-lock condition, will invert the phases of the sine and cosine function voltages supplied to the horizontal and vertical deflection coils to thereby enable said scanning pattern to reassume lock-on upon said target image if the target has suddenly become brighter than its background.

In accordance with a third feature of the invention, logic means is provided to cage the nutating electron beam to a very small angular value during the initial lock-on procedure, and also to cause said nutating beam to follow a collapsing spiral path under the control of the automatic lock-on circuit.

The above mentioned and other objects and features of the invention will become more clearly understood from the following detailed description thereof when read in conjunction with the drawings in which:

FIGS. 1 and 2 together show a functional logic diagram of the overall system;

Figure 1:
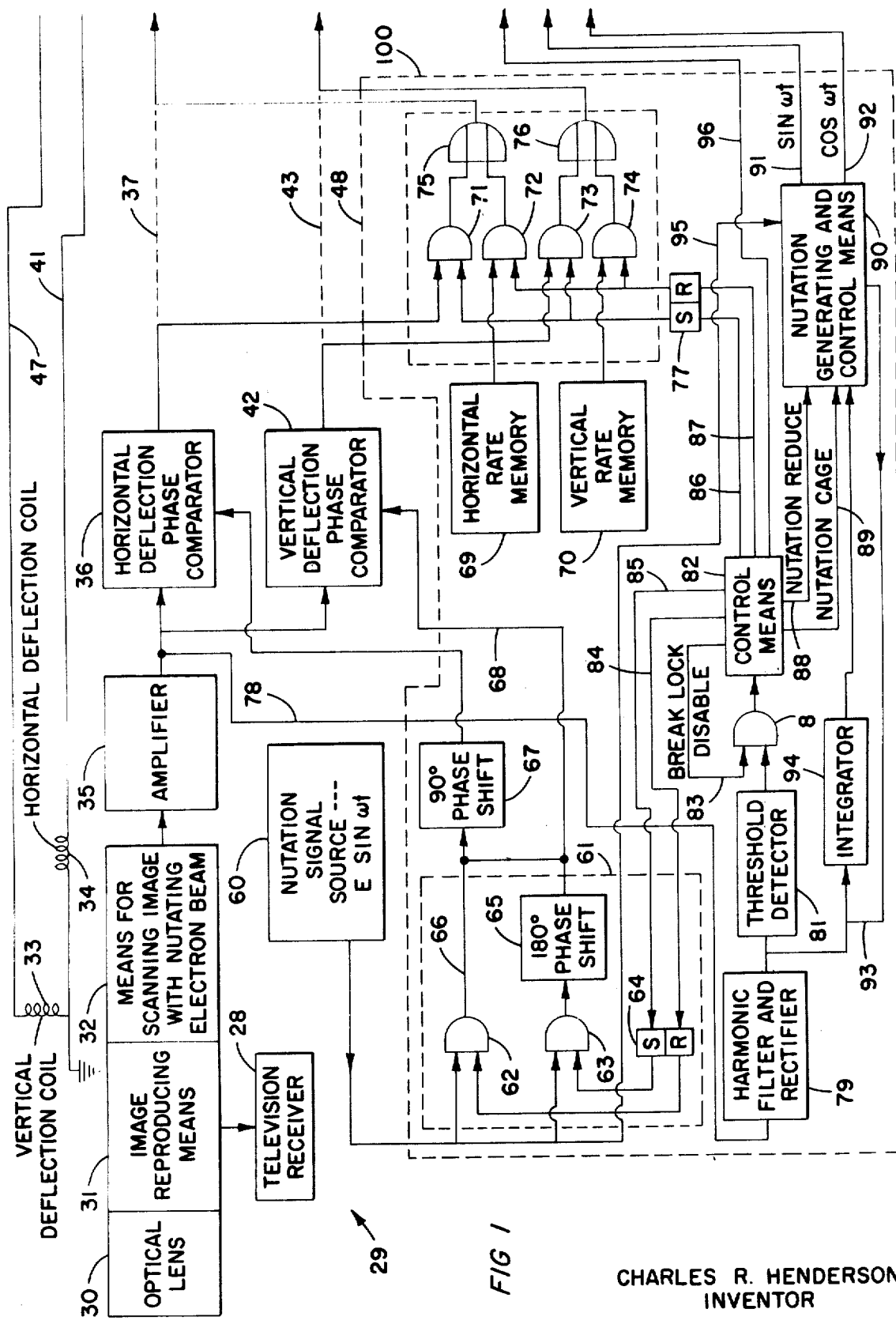
Figure 5:
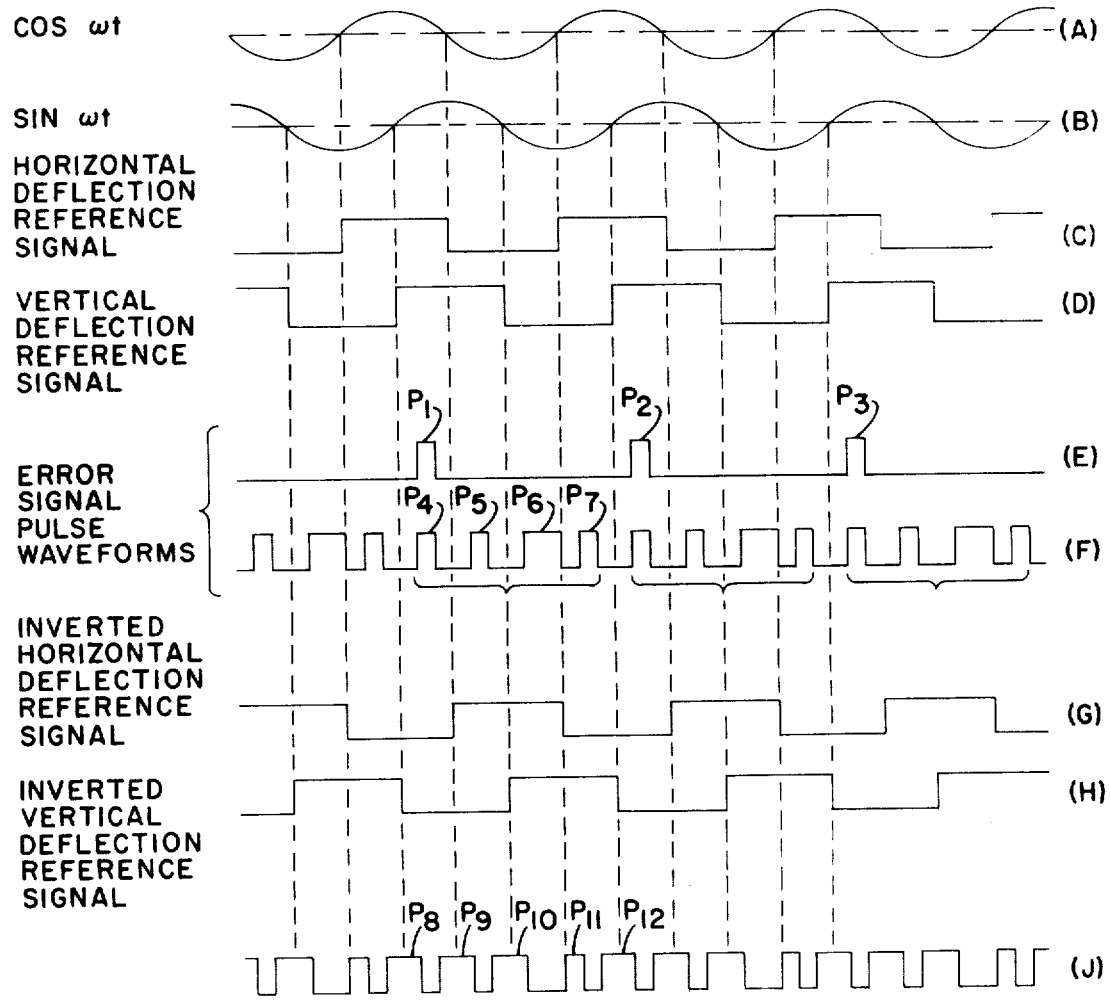
Figure 6:
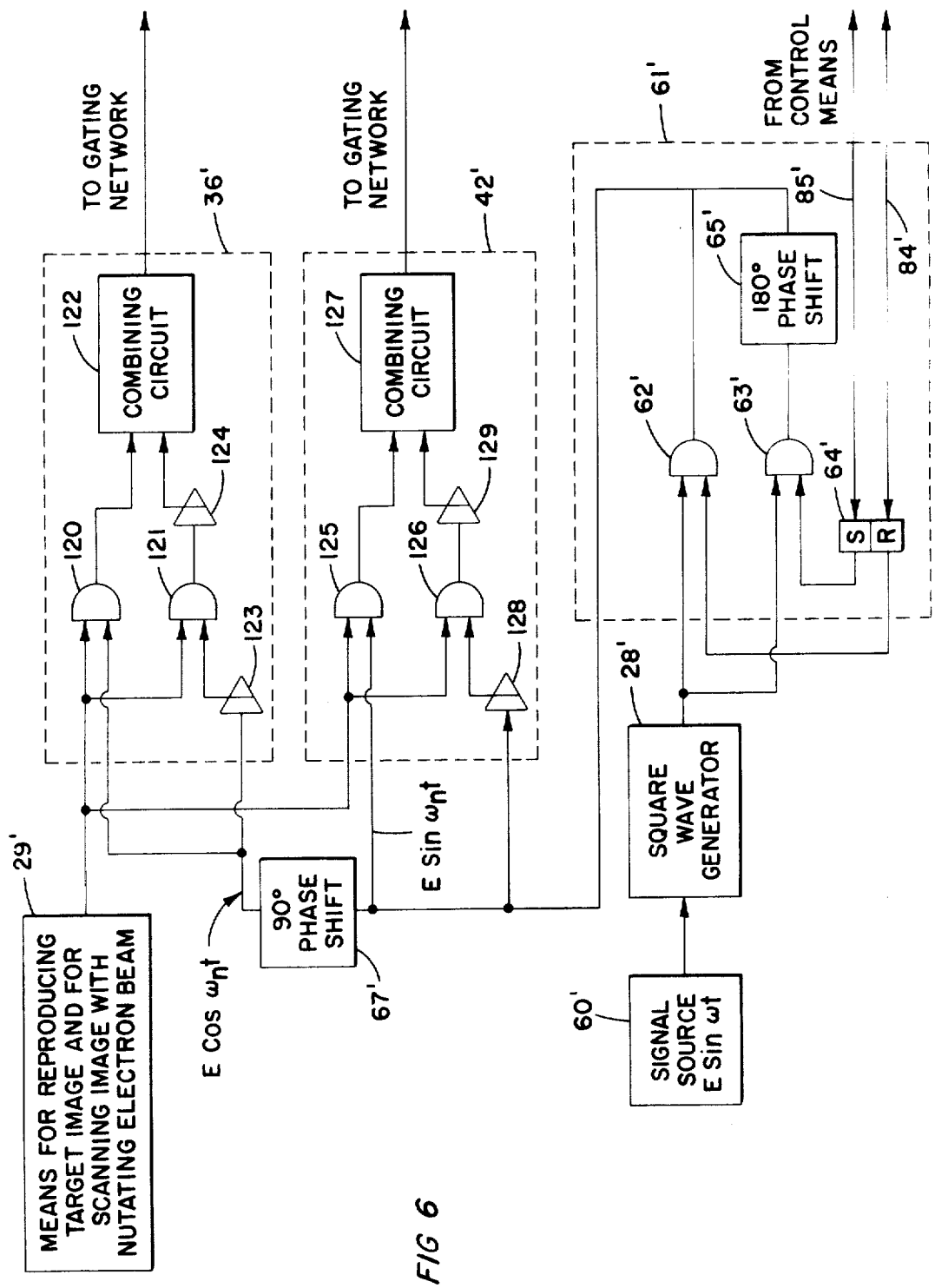
Figure 7:
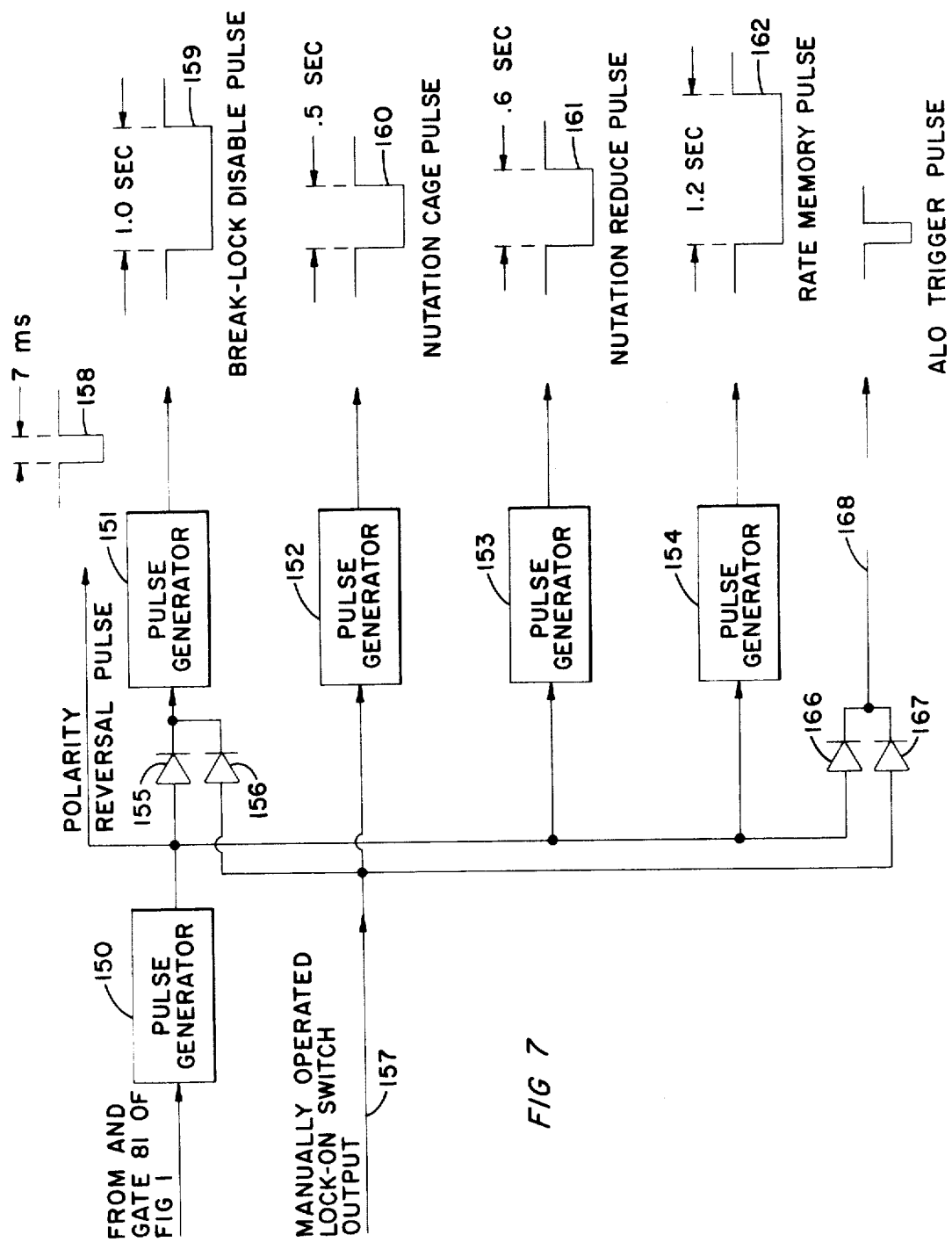
Figure 8:
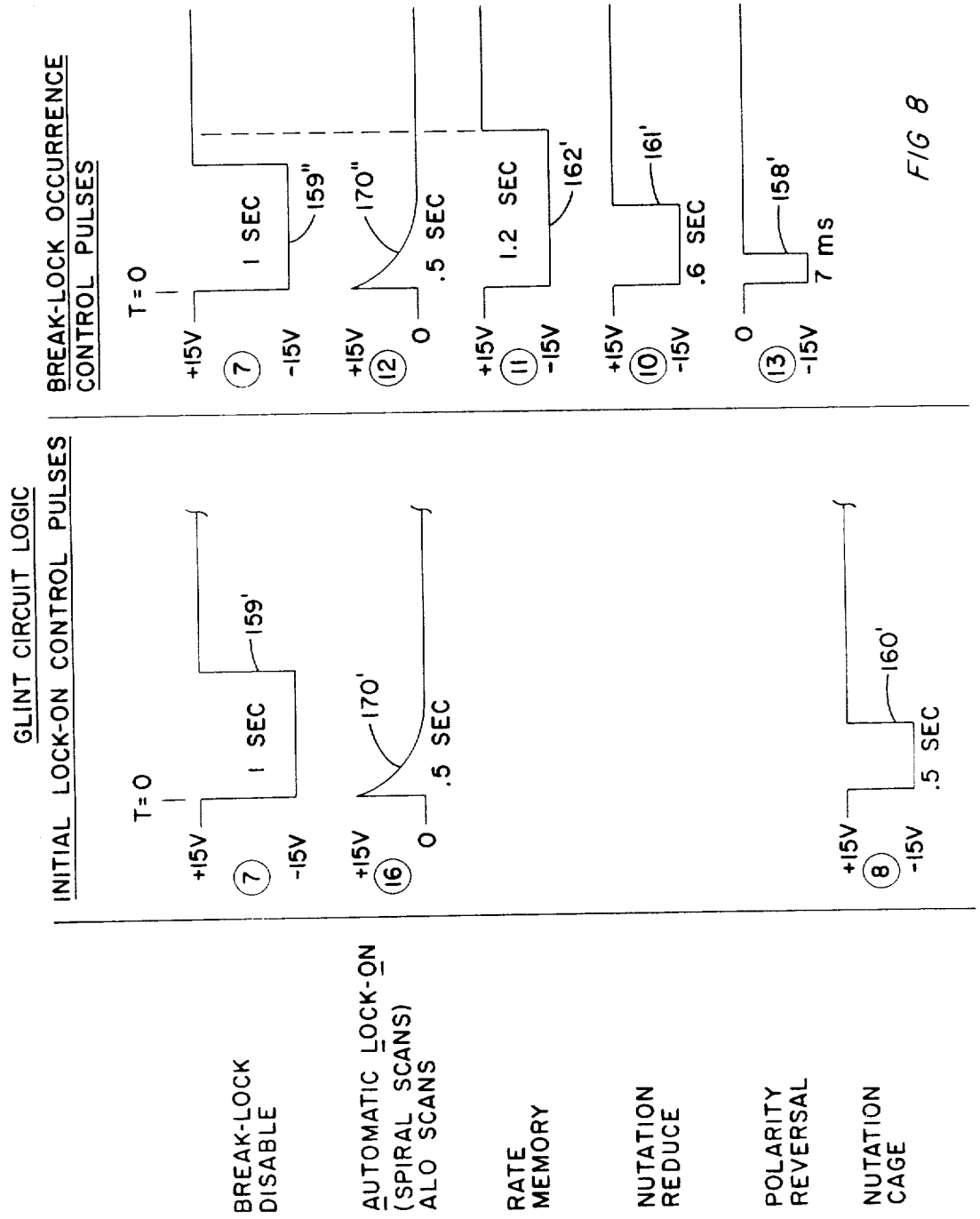
Figure 9:
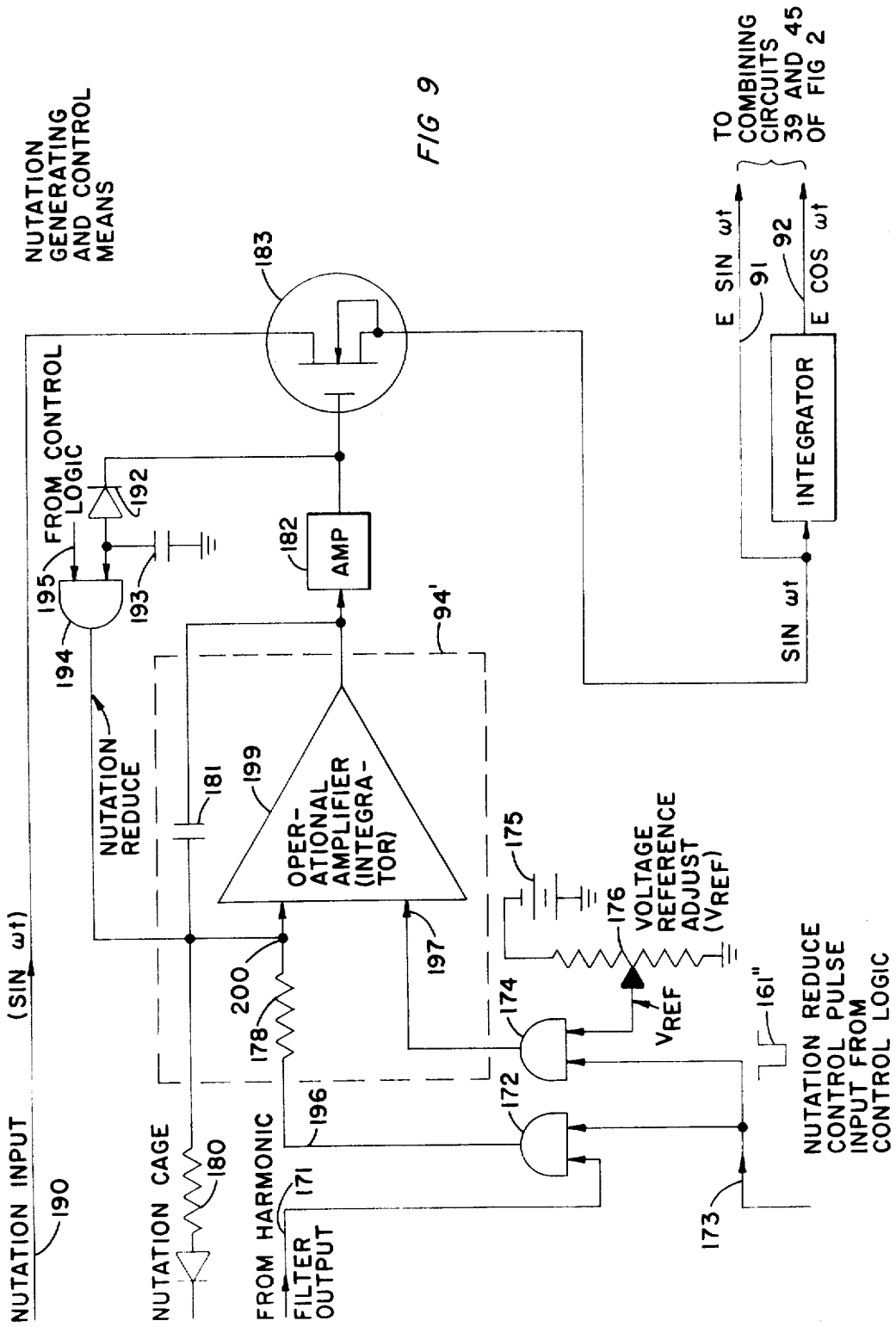
Figure 10:
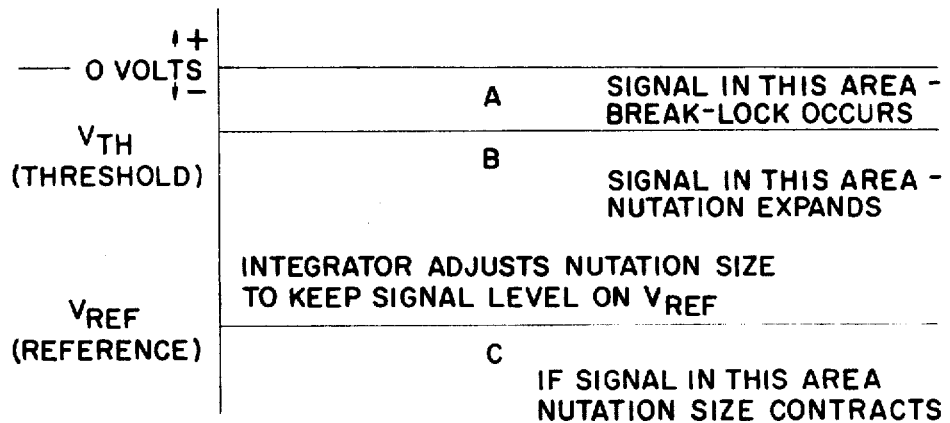
Figure 11:
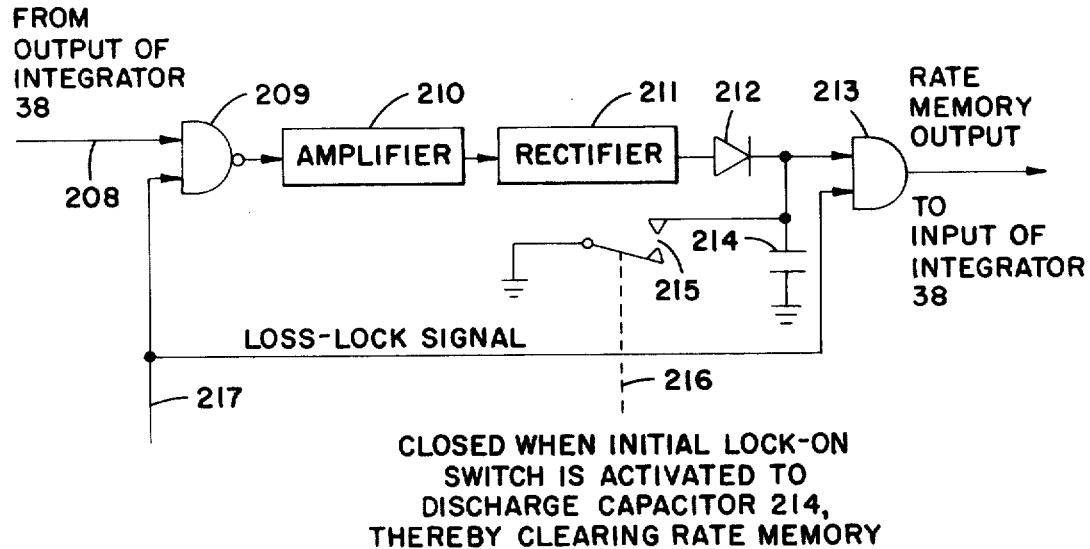
Figure 12:
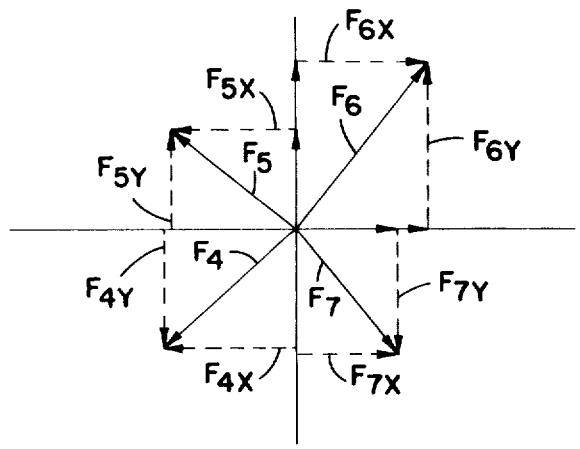
Figure 13:
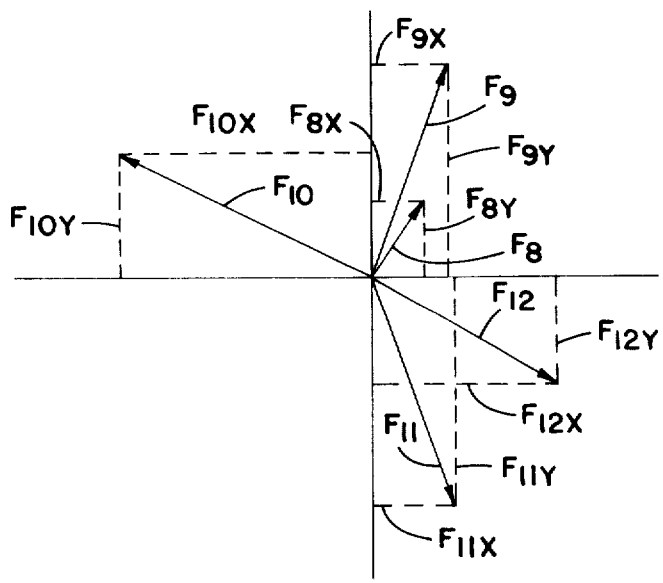
Figure 14:
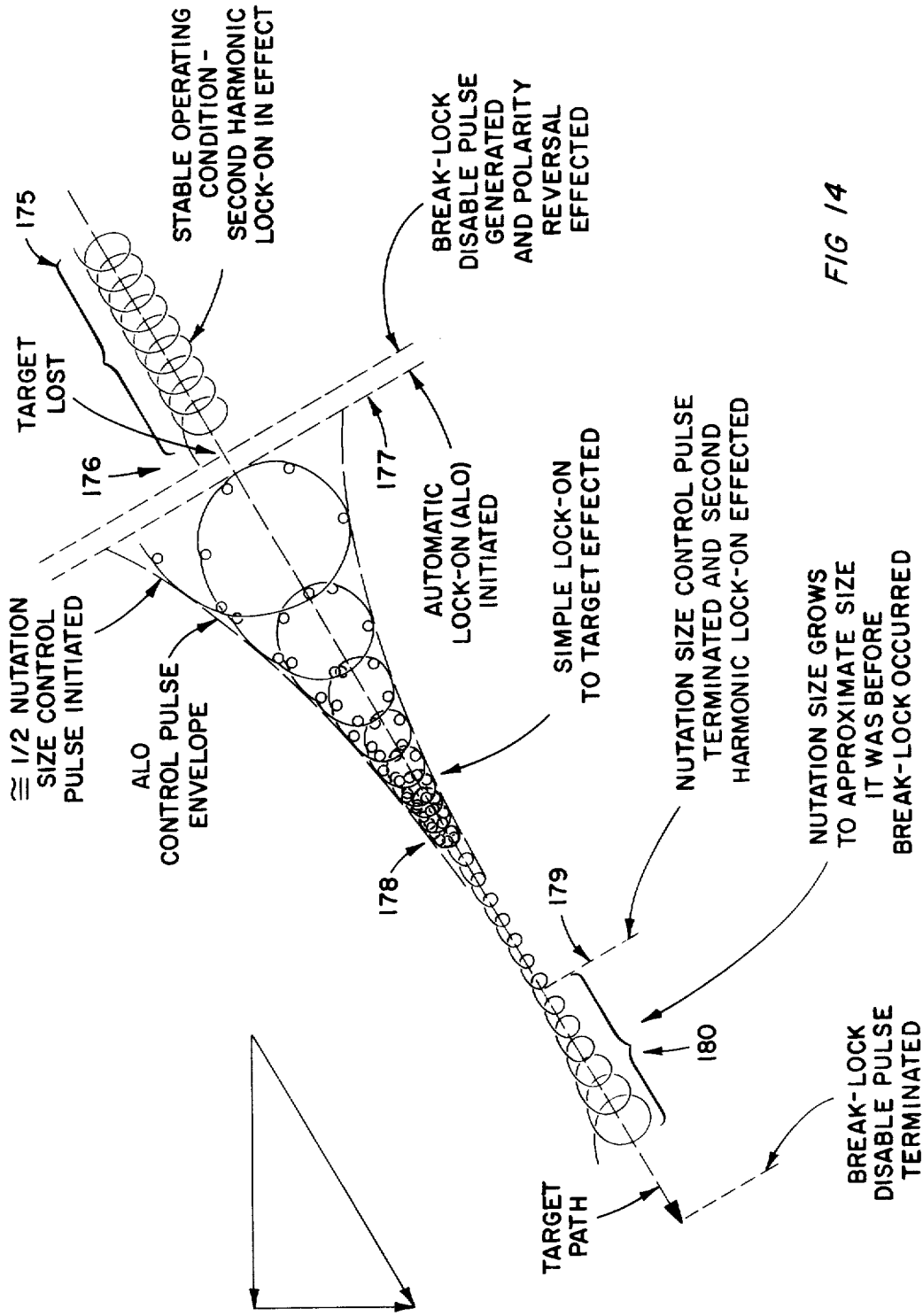
Figure 15:
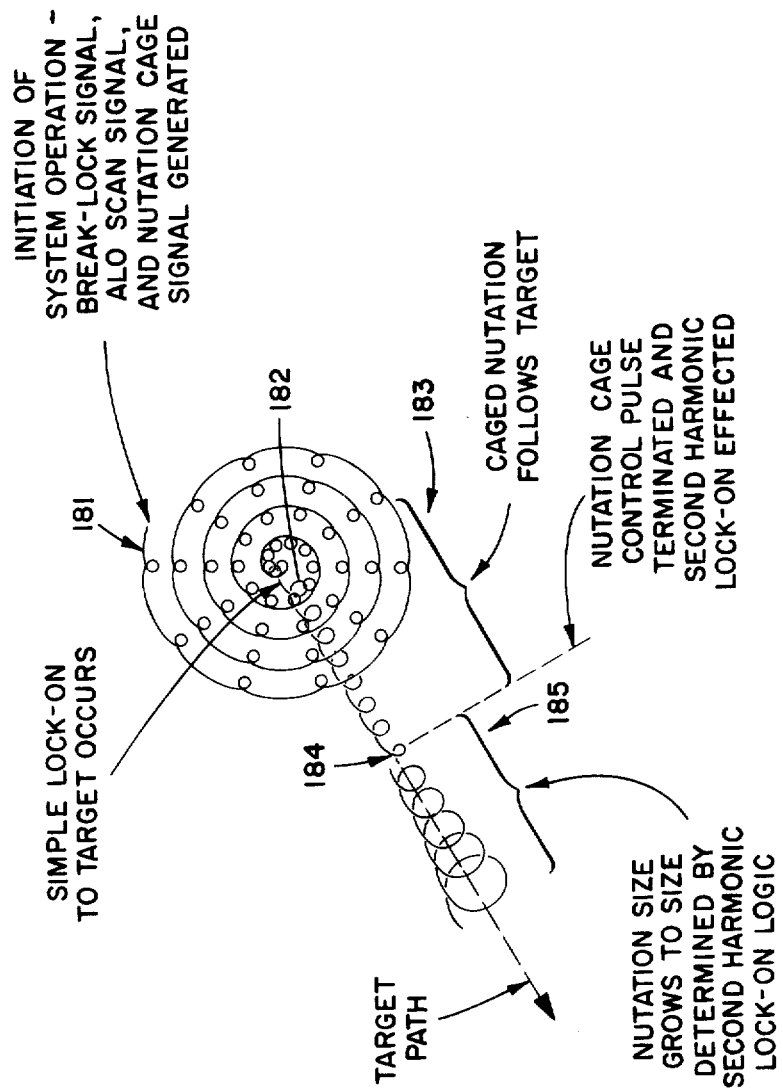
Figure 16:
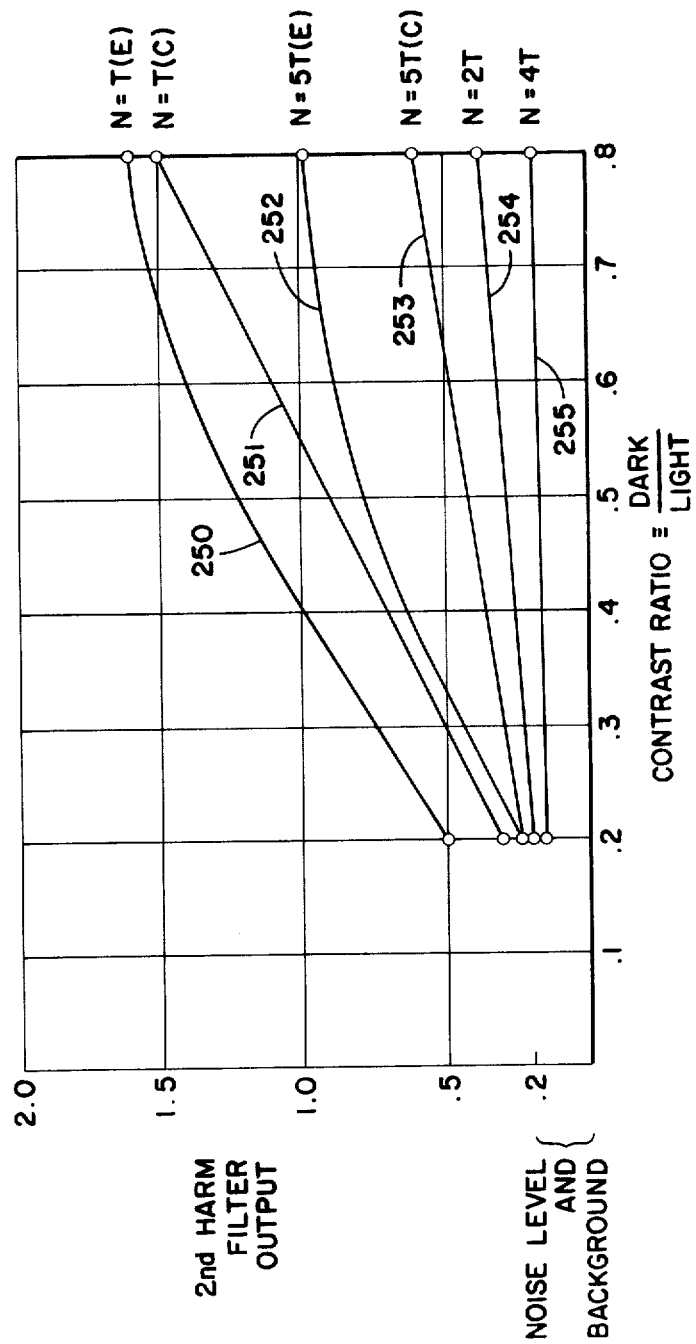

FIG. 5 is a set of waveforms showing the relationship between the sine and cosine function voltages supplied to the deflection coils of the image reproduction tube and the signals produced as a result of the nutating electron beam cutting across one or more segments of the light background, both for scanning pattern results from the operation of the first control means alone, and also the scanning pattern that results from the cooperation of both the first and second control means;

FIG. 6 is a diagram of the logic means by which the sine and cosine function voltages which are supplied to the horizontal and vertical deflecting coils of the image reproducing tube are inverted in the event that the target suddenly becomes brighter than the background;

FIG. 7 is a logic diagram of the function control means of FIG. 1;

FIG. 8 is a set of waveforms of the pulses generated by said function control means of FIG. 7;

FIG. 9 is a combination logic and schematic diagram of the nutation generating and control means of FIG. 1;

FIG. 10 is a chart showing the relation between the d-c value of the rectified second harmonic component generated by the scanning electron beam and the desired size of the scanning pattern;

FIG. 11 is a combination schematic and logic diagram of the rate memory of FIG. 1;

FIG. 12 is a vector diagram illustrating the balanced condition of d-c voltage components supplied to the horizontal and vertical deflection coils of the image reproducing tube when the scanning pattern is stabilized upon a dark target positioned upon a light background;

FIG. 13 is another vector diagram showing the d-c voltage components generated by the electron beam and supplied to the horizontal and vertical deflection coils of the image reproducing tube when the target suddenly becomes a light object upon a dark background;

FIG. 14 is a diagram showing the scanning path of the electron beam as the system passes from a stable operating condition to a break-lock condition, and then back to a stable operating condition;

FIG. 15 is a diagram showing the scanning path of the electron beam during the initial lock-on period;

FIG. 16 is a set of curves showing the amount of second harmonic signal generated.

The description of the invention will be organized in accordance with the following organization outline.

I — GENERAL DESCRIPTION OF SYSTEM

A — LOGIC FOR MAINTAINING NUTATING ELECTRON BEAM LOCKED ON TARGET IMAGE (FIGS. 1, 2, 4 and 5)

B — LOGIC FOR EXPANDING SIZE OF NUTATING ELECTRON BEAM SUFFICIENTLY TO GENERATE SECOND HARMONIC SIGNAL (FIGS. 1, 2, 4, 5 and 10)

C — CONTROL LOGIC FOR REESTABLISHING LOCK-ON TO TARGET IMAGE AFTER BREAK-LOCK OCCURS (FIGS. 6, 7, 8, 9 and 11)

D — CONTROL LOGIC FOR ORIGINALLY INITIATING FINDING OF TARGET IMAGE AND LOCK-ON THEREOF (FIGS. 7, 8, 9 and 10)

II — DESCRIPTION OF OPERATION OF THE SYSTEM

A — OPERATION DURING INITIAL START-UP MODE

B — OPERATION DURING STEADY STATE OPERATING MODE

C — OPERATION DURING BREAK-LOCK MODE AND RECAPTURE OF TARGET

In describing the invention several phrases will be employed repeatedly to describe various functions of the system. Some of these phrases are defined in a general manner immediately below in order to enable the reader to better understand the following description.

A. Simple lock-on — the locking on of the nutating scanning pattern of the electron beam entirely within the body of the target. Each time the scanning pattern attempts to move onto the background a voltage is generated which causes the scanning pattern to move back onto the target body.

B. Harmonic lock-on — This condition exists after simple lock-on has occurred and the nutating scanning pattern has been caused to enlarge in diameter until two or more portions of the background are cut by the scanning pattern to generate a second harmonic output signal whose amplitude is employed to stabilize the size of said nutating scanning pattern. The position of the scanning pattern on the target is also stabilized.

C. Break-lock disable — A function whereby if, after harmonic lock-on has occurred, the target should be lost due to its passing behind a cloud or if it should suddenly reflect the sun and become a bright object on a dark background, for example, logic which detects the second harmonic component is, in effect, disconnected from the systems so that a simple lock-on can be initiated.

D. Memory rate — A logic means which memorizes the rate and direction of the target image on the image reproducing tube so that the system will know approximately where to search for the target after a break-lock disable has occurred.

E. Automatic lock-on spiral scan — A logic means which is energized upon the occurrence of a breaklock disable condition to cause a reduced-in-size scanning pattern to follow a collapsing spiral path whose nominal center in turn follows the remembered path of the target.

F. Nutation reduced — A logical function whereby, in preparation to recapture a target after a break-disable has occurred, the size of the nutation scanning pattern is reduced to approximately half its operating size.

G. Nutation cage — A logical function wherein the diameter of the scanning pattern of the nutating electron beam is reduced to a very small value in preparation for establishing a simple lock-on to a target when the system is energized initially.

I. GENERAL DESCRIPTION OF SYSTEM

A. LOGIC FOR MAINTAINING NUTATING ELECTRON BEAM LOCKED ON TARGET IMAGE — FIGS. 1, 2, 4 and 5.

Figures 2, 3:
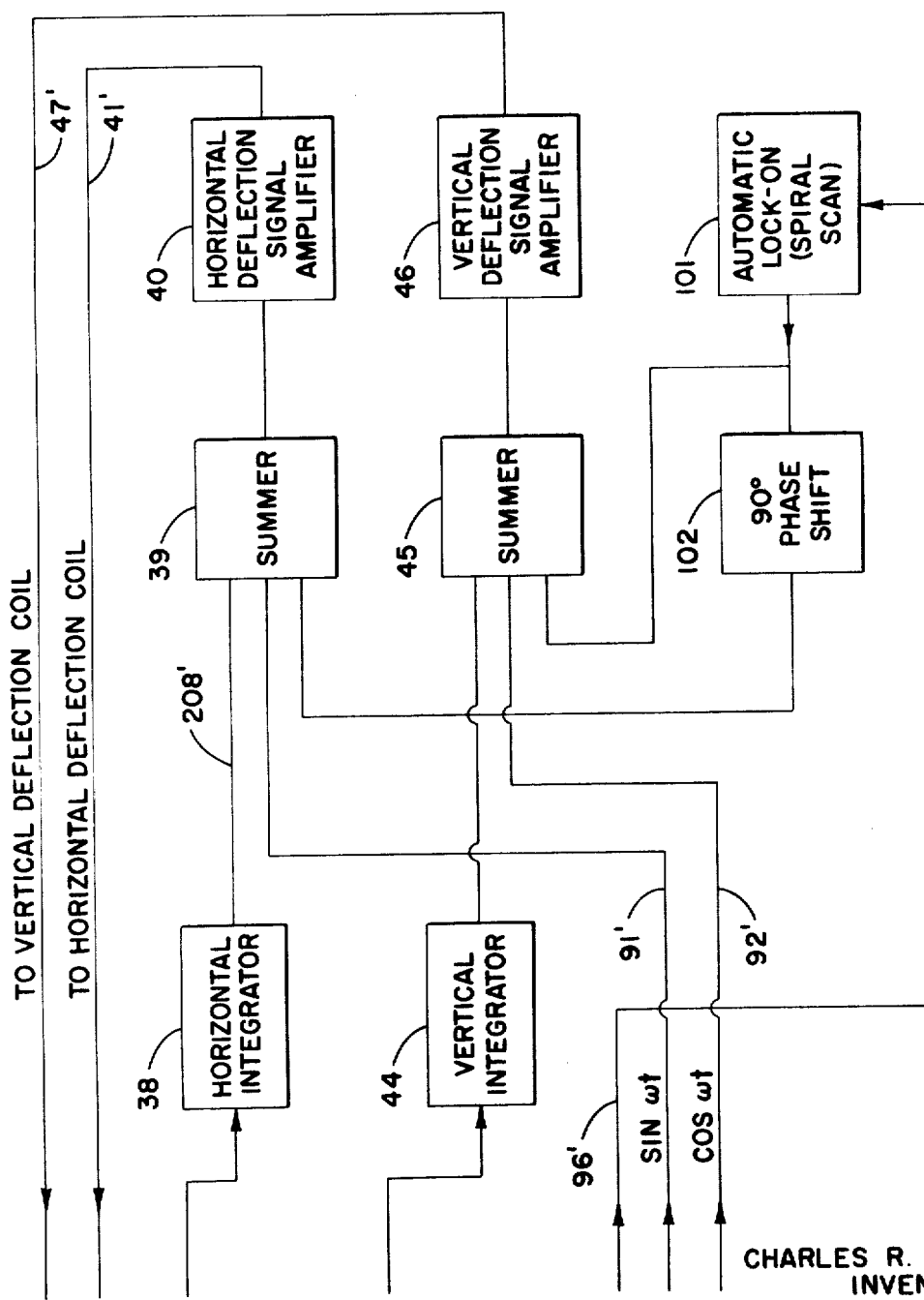
FIG. 3 shows how FIGS. 1 and 2 fit together.

The structures of FIG. 1 and FIG. 2 represent the overall system and must be considered together in accordance with the diagram of FIG. 3. Such overall system can be divided generally into two main control logic means: one of these control logic means included within the dotted block 100 in FIG. 1 and the other main control logic means comprises the remainder of FIGS. 1 and 2.

It is to be understood that these two main control logic means are not completely independent of each other and, in fact, cooperate with each other to maintain the electron beam nutating scanning pattern at a definite size with respect to the target, and also locked upon said target.

The logic for maintaining simple lock-on of the scanning pattern upon the target is comprised essentially of that logic of FIGS. 1 and 2 lying outside the dotted block 100, whereas the logic lying within the dotted block 100 is employed to enlarge the scanning pattern of the nutating electron beam until it cuts into the light background around the target to generate the desired second harmonic from which the size of said nutating scanning pattern with respect to the target body can be approximated.

Consider first the logic outside the dotted block 100, i.e. the logic employed to establish a simple lock-on of the scanning pattern upon the target. The block 29 is divided into three partitions 30, 31 and 32 which represent, respectively, an optical means 30 for projecting an image of the target upon an image reproducing means 31. A scanning means 32 is provided to scan the reproduced image in a nutating scanning pattern.

When the operation of system is initiated originally, it is necessary that the pilot manually slew the nutating scanning pattern upon the target, at which time the start-up logic, which will be described in detail later, will function to search the immediate area at which the nutating beam is directed until it finds the target and simple lock-on will occur.

During simple lock-on the scanning pattern can move freely about the dark body of the target and an output signal will be generated by the scanning means only when the nutating scanning pattern begins to move off the dark body of the target and onto the light background area.

As is well known in the art the nutating scanning pattern is obtained by applying sine and cosine function voltages to the vertical and horizontal deflection coils of the electron beam which is scanning the target image. Should the scanning pattern begin to move off the dark body of the target and onto the light background area the said scanning pattern will cut across that portion of the light background area upon which it has moved during a time period which bears a very specific phase relation with the sine and cosine voltages which are generating the nutating scanning pattern.

The horizontal deflection phase comparator 36 and the vertical deflection phase comparator 42 function generally to compare any signal generated by the movement of the scanning pattern off the dark body of the target with the sine and cosine function voltage driving the vertical and horizontal deflection coils.

In order to provide better phase comparison the actual signals supplied to the phase comparators 36 and 42 are square waves rather than sine and cosine waveforms. Specifically such square waveforms are shown as waveforms C and D of FIG. 5 and can be seen to be in phase with the cosine and sine waveforms of curves A and B, insert respectively, of FIG. 5. The square wave signals of waveforms C and D are identified herein as phase comparator reference signals. The signals represented by waveforms A and B of FIG. 5 are the signals supplied to the horizontal and vertical deflection coils.

Each of the phase comparators 36 and 42 functions in cooperation with integrators 38 and 44 to produce d-c voltages which are supplied back to the vertical and horizontal deflection coils 33 and 34 through summers 39 and 45 and amplifiers 40 and 46, and which have a magnitude and a polarity calculated to move the scanning pattern away from any light background which it is intercepting and back into the dark body of the target.

Integrators 38 and 44 and amplifiers 40 and 46 are conventional devices which need no further explanation. The summers 39 and 45 are simply voltage adding circuits which combine the outputs of integrators 38 and 44 with other signals supplied thereto from leads 91' and 92', and also the output from the automatic lock-on circuit 101 to produce other functions which will be described later. In the absence of signals appearing on the leads 91' and 92', and in the absence of an output from the automatic lock-on circuit 101, the only signals passing through the summers 39 and 45 are those d-c voltages appearing at the output of integrators 38 and 44 respectively.

Figure 4:
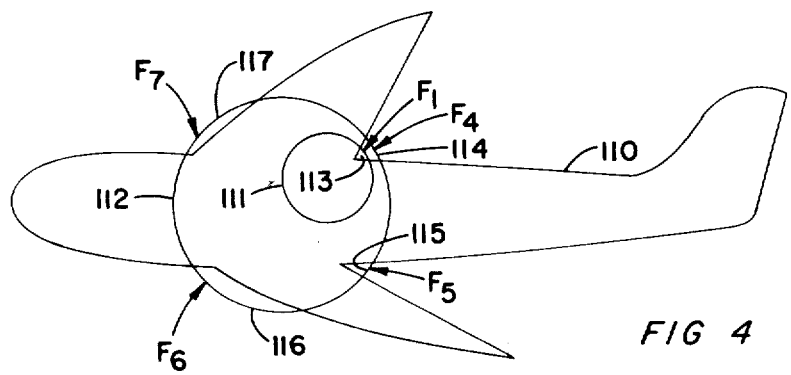
FIG. 4 is a diagram of a target with two nutating scanning patterns shown thereon; the smaller pattern being representative of the type scanning pattern that might be produced by the first control means alone, and the larger pattern representative of the type pattern that might be obtained by the cooperation of the entire system including both the first control means and the second control means.

A typical scanning pattern which might be generated by the simple lock-on logic (outside the block 100) might be a pattern as represented by scanning pattern 111 of FIG. 4. The scanning pattern 111 is shown as intercepting a small portion 113 of the light background around the target 110. A pulse $P_1$ (waveform E of FIG. 5) is generated during the time said scanning pattern is cutting across the segment 113 of the light background and a force $F_1$ is generated which tends to push the scanning pattern 111 downward and to the left, back onto the body of target 110.

A typical scanning pattern which will be generated when all of the logic of FIGS. 1 and 2 is employed i.e. both the simple and harmonic lock-on logic, is represented by the circle 116 in FIG. 4, which circle can be seen to intercept the light background over four segments 114, 115, 116 and 117. At each of these interceptions of the light background the electron beam will generate a signal which ultimately will be transformed into a d-c voltage tending to push the scanning pattern 116 back onto the dark target. However, since the harmonic lock-on logic requires that second harmonic is generated only as a result of the scanning pattern cutting the light background, a condition of stability can be reached only when the d-c voltage components generated for and supplied to the horizontal deflection coil of the electron beam total to zero, and the d-c components which are generated for and supplied to the vertical deflection coil of the electron beam also total to zero.

Reference is again made to the waveforms A, B, C, D and E of FIG. 5 which illustrate the signals required to generate the simple lock-on scanning pattern 111, including the waveform of the signal which is fed back to the deflecting coils to force said scanning pattern 111 downward and to the left in FIG. 4 as a result of its cutting across the light background segment 113.

More specifically in FIG. 5 the waveforms A and B show the cosine and sine function voltages which are generated by the signal source 60 in FIG. 1 and which are supplied to the horizontal and vertical deflection coils 33 and 34. The waveforms C and D represent the square wave reference signals which are in phase respectively with the cosine and the sine function voltages of waveforms A and B. The square wave reference signals of waveforms C and D are supplied respectively to the horizontal and vertical deflection phase comparators 36 and 42. The phase relationship between the reference signals supplied to the phase comparators 36 and 42 of FIG. 1 and the cosine and sine function voltages supplied to the horizontal and vertical deflection plates can be seen to be coincident.

Each time the scanning pattern 111 of FIG. 4 cuts the segments 113 of the light background a positive pulse is generated. These positive pulses are shown in the waveform E of FIG. 5 identified as pulses $P_1$, $P_2$ and $P_3$, for example. It can be seen that each of these pulses $P_1$, $P_2$ and $P_3$ occurs during the time that both the horizontal and the vertical deflection reference signals of waveform C and D are in their positive half cycles which is in correspondence with the fact that the scanning pattern 111 cuts across the light background segment 113 in the upper right hand quadrant of the circle defined by the scanning pattern 111.

The phase comparators 36 and 42 of FIG. 1 then function to pass positive pulses corresponding to the occurrence of the pulses $P_1$, $P_2$ and $P_3$ of waveform E of FIG. 5. These positive pulses are then supplied respectively to integrators 38 and 44 of FIG. 2, then to summers 39 and 45, and then to the horizontal and vertical deflection signal amplifiers 40 and 46. The resultant d-c output voltage from the horizontal and vertical deflection amplifiers 40 and 46 is then supplied back to the horizontal and vertical deflection coils 34 and 33 to push the scanning pattern 111 downward and to the left so that it will tend to scan entirely on the black target surface.

It is to be noted that in order to obtain the proper output voltage polarity it is necessary that the positive voltage signal derived from positive pulses $P_1$, $P_2$ and $P_3$ of waveform E of FIG. 5 have their polarity reversed, that is to say the output of the horizontal and vertical deflection amplifiers 40 and 46 must be a negative d-c voltage. While such polarity inversion can occur anywhere in the circuit the amplifiers 40 and 46 are herein designated as performing the polarity inversion function.

I – B — LOGIC FOR EXPANDING SIZE OF NUTATING ELECTRON BEAM SUFFICIENTLY TO GENERATE SECOND HARMONIC SIGNALS (FIGS. 1, 2, 4, 5 and 10)

Once the nutating scanning pattern has obtained simple lock-on upon the dark target it is desirable to expand the scanning pattern until it cuts at least two separate segments of the light background, thereby assuring that the size of the scanning pattern is somewhat proportionate to the size of the target image. More specifically, if the target image is small then the scanning pattern should be small. If the target image is large, the scanning pattern should be large.

As the intercepting aircraft approaches the target and its image size increases, the scanning pattern should also increase. By such increasing of the scanning pattern size random movement of the scanning pattern within the dark body of the target, perhaps to the end of a wing section or to the tip of the tail, is eliminated.

The logic within block 100 functions to enlarge and maintain the size of the scanning pattern so that it does in fact cut across two or more segments of the light background. Essentially, the increasing of the scanning pattern size to a desired size is accomplished by detecting the second harmonic generated when the scanning pattern intercepts said two or more portions of the light background.

The output from the image scanning means 32 is supplied through appropriate amplifier means 35 and then into a harmonic filter and rectifier 79, which can be conventional circuits. More specifically the harmonic filter 79 is designed to detect the second harmonic in the signal generated by the scanning electron beam. Such second harmonic is rectified and supplied to integrator 94 which generates a d-c voltage proportional to the amount of said second harmonic supplied thereto. Such d-c voltage is then supplied to nutation generating and control means 90 which contains a reference voltage $V_{ref}$ against which the d-c output of generator 94 is compared.

As a result of the comparison of the output of integrator 94 and the reference voltage $V_{ref}$, the sine and cosine function output voltages appearing on output terminals 91 and 92 are either increased or decreased to increase or decrease the size of the nutating scanning pattern. More specifically the sine and cosine function voltages appearing on output terminals 91 and 92 are supplied back to the vertical and horizontal deflection coils 33 and 34 through the summer circuits 39 and 45 and the amplifiers 40 and 46, respectively. Such sine and cosine function voltages create the nutating scanning pattern with the magnitude, thereof determining the size of such scanning pattern. Assume the scanning pattern grows to the size represented by pattern 112 of FIG. 4.

Referring now to the waveform F of FIG. 5 there is shown the pulses generated by the target image reproducing tube as a result of the large scanning pattern 112 of FIG. 4 cutting across the segments 114, 115, 116, and 117 of the light background.

Four pulses are generated each complete revolution of the nutating beam. For example, pulses $P_4$, $P_5$, $P_6$ and $P_7$ of waveform F of FIG. 5 represent the pulses generated as the scanning pattern cuts across the segments 114, 115, 116, and 117, respectively, of the light background, as shown in FIG. 4.

Each of these pulses $P_4$ through $P_7$ generates either a positive or a negative d-c voltage component in both the horizontal and vertical deflection coils. For example, the pulse $P_4$ will generate a negative d-c voltage for both the vertical and horizontal deflection coils in much the same manner as the pulse $P_1$ in the waveform E does. The same logic of FIGS. 1 and 2 is employed to generate d-c voltage components from the pulses $P_4$ to $P_7$ as was employed to generate the d-c voltage components from the pulse $P_1$.

The pulse $P_5$ components be seen to occur during the negative half cycle of the horizontal deflection reference signal of waveform C of FIG. 5 and during the positive half cycle of the vertical deflection reference signal of waveform D. Consequently a positive d-c voltage will be supplied to the horizontal deflection coil, and a negative d-c component will be supplied to the vertical deflection coil. The resultant effect of these two d-c components is to move the scanning pattern 112 in the direction of the vector $F_5$ in FIG. 4. Similarly the pulse $P_6$ in waveform F of FIG. 5 will result in the generation of d-c components which will tend to move the scanning pattern 112 in a direction indicated by the vector $F_6$. The fourth pulse $P_7$ will result in d-c components being supplied to the horizontal and vertical deflection coils which will tend to move the scanning pattern 112 in the direction indicated by vector $F_7$.

In order to stabilize the scanning pattern it is necessary that all of the horizontal or X components of the vectors $F_4$, $F_5$, $F_6$ and $F_7$ total to a value of zero. Similarly all of the vertical or Y components of the vector $F_4$ through $F_7$ must total to a value of zero.

Reference is made to FIG. 12 which shows a vector diagram of the four force vectors $F_4$ through $F_7$ separated into their horizontal and vertical (X and Y) components. From FIG. 12 and the above discussion it can be seen that the following conditions must exist in order for the position of the scanning pattern 112 of FIG. 4 to be stabilized.

$$F_{4x} + F_{5x} + F_{6x} + F_{7x} + 0 \qquad \text{Exp. (1)}$$
$$F_{4y} + F_{5y} + F_{6y} + F_{7y} + 0 \qquad \text{Exp. (2)}$$

It is to be noted that the pulse train shown in waveform F of FIG. 5 is also supplied to the harmonic filter and rectifier circuit 79 of FIG. 1, wherein the second harmonic generated by the nutating scanning pattern is extracted and rectified, and then integrated in integrator 94. As indicated above the magnitude of the d-c voltage resulting from rectification and integration of the second harmonic must approach the reference voltage $V_{ref}$ of FIG. 10.

The specific logic to accomplish the expansion or contraction of the scanning pattern 112 to generate such a second harmonic is shown in FIG. 9. While, as discussed hereinbefore, the size of the nutating scanning pattern will be caused to assume different values in accordance with different situations such as during start-up and immediately after a break-lock occurs only the size of the scanning pattern during the stable operating conditions will be discussed in the following few paragraphs.

In FIG. 9 the integrator 94' corresponds to integrator 94 of FIG. 1 and is comprised of operational amplifier 199 and a time constant which includes capacitor 181 and resistor 178.

The output from the harmonic filter and rectifier 79 of FIG. 1 is supplied to the input 196 of integrator 94' through gating means 172. The other input 197 of integrator 94' is connected to the desired reference voltage $V_{ref}$ shown in FIG. 10 through gating means 174. The voltage reference $V_{ref}$ is determined by negative battery source 175 connected in series with resistor 176 which has an adjustable tap 177 connected thereto.

The AND gates 172 and 174 are both normally conductive so that both the output signal from the harmonic filter and rectifier 79 of FIG. 1 and also the voltage reference $V_{ref}$ are supplied respectively to the input leads 196 and 197 of integrator 94'.

Amplifier 182 amplifies the d-c output of integrator 94' and supplies such amplified output to the gate electrode of field effect transistor (FET) 183. The FET 183 functions as an impedance which varies in accordance with the magnitude of the d-c voltage supplied to the gate electrode from amplifier 182.

The nutation input, which is supplied via lead 190 from the output of the signal source 60 of FIG. 1, is then attenuated by FET 183 in accordance with the output of amplifier 182.

Such attenuated signal (E sin $wt$) is then supplied to integrator 198 which forms a signal E cos $wt$, in quadrature therewith. Thus, on the output terminals 91 and 92 there appear the sine and cosine function voltages employed to drive the vertical and horizontal deflection coils of the image reproducing tubes. Such sine and cosine function voltages appearing on output leads 91 and 92 are supplied to the summing circuits 39 and 45 of FIG. 2.

Referring again to integrator 94' it can be seen that under normal operating conditions, with gates 172 and 174 conductive, the output voltage of integrator 94' will be determined by the setting of tap 177 on resistor 176, which setting determines the value of the voltage reference $V_{ref}$. Thus the d-c component of the rectified second harmonic derived from the electron beam as it scans the target image is controlled by the value of $V_{ref}$. More specifically the value of the d-c component derived from said scanning pattern and appearing at input 196 of integrator 94' will substantially be equal to the reference voltage $V_{ref}$ supplied to input lead 197. The amplitude of the sine and cosine function voltages appearing on output terminals 91 and 92 are either increased or decreased until the two d-c voltages on input leads 196 and 197 are substantially equal.

I - C — CONTROL LOGIC FOR REESTABLISHING LOCK-ON TO TARGET IMAGE AFTER BREAK-LOCK OCCURS. (FIGS. 1, 2, 6, 7, 8, 9, and 11)

Occasionally the target will catch the rays of the sun and reflect them towards the image reproducing tube, and thereby become a bright object upon a dark background. Due to the simple lock-on logic described above in section I - A the scanning pattern consequently is caused to be pushed off the target completely and will then wander at random upon the background which has now become the darker of the two areas. Eventually the scanning pattern will perhaps lock upon a dark cloud, if logic were not provided for recapturing the target.

However, such logic is provided and consist essentially of a memory means which remembers the rate and direction of the target. Such logic also performs the function of reversing the phases of the two quadrature phased phase comparator reference signals supplied to phase comparators 36 and 42 of FIG. 1 so that, in effect, the scanning pattern will now be forced off the darker background and towards the lighter body, which presumably is now the target.

To further enhance the possibility of recapturing the target the size of the nutation scanning pattern is reduced to approximately half of the size it was at the time break-lock occurred. In addition, the automatic lock-on (ALO) feature is initiated which functions to cause the center of said reduced nutation scanning pattern to follow the path of a collapsing spiral whose center moves in a path coincident with the rate and direction of the target as remembered by the logic at the time of break-lock.

FIG. 6 shows the logic for reversing the phases of the phase comparator reference signals which are supplied to phase comparators 36 and 42 of FIG. 1.

It is to be understood that the logic of FIG. 6 is, in essence, a switching circuit, and, functions not only to pass the inverted phase reference signals shown in waveforms G and H of FIG. 5 but also to pass the uninverted phase reference signals shown in waveforms C and D of FIG. 5.

The logic of FIG. 6 will be discussed first in a general manner and then the specific means by which switching is effected to selectively pass either the uninverted or the inverted phase comparator reference signals will be discussed.

In FIG. 6 each of the phase comparators 36' and 42' can be seen to consist of a pair of AND gates whose outputs are supplied to a combining circuit. More specifically the horizontal deflection phase comparator 36' is comprised of AND gates 120 and 121, with the output of AND gate 120 being supplied directly to combining circuit 122 and the output of AND gate 121 being supplied to said combining circuit 122 through inverter 124. AND gate 120 passes a positive pulse in response to coincident positive pulses from the electron beam image reproducing tube 29 of FIG. 1 and the phase comparator reference signal from 90° phase shift logic 67'. The AND gate 121 produces a positive output in response to coincident positive output signals from the image reproducing tube and the negative or lower level signals, from the 90° phase shift circuit 67'. However, the output of AND gate 121 is inverted by inverter 124 so that the actual signal supplied to combining circuit 122 from AND gate 121 is a series of negative pulses corresponding in time to the cutting of the light background by the scanning pattern. The combiner 122 combines the positive pulses from AND gate 120 and the negative pulses from AND gate 121 and then supplies the combined pulses through a gating network to ingegrator 38 of FIG. 2. The integrator 38 responds to the train of positive and negative pulse supplied thereto to produce a resultant d-c voltage whose polarity and magnitude indicate the direction and the distance the scanning pattern is to be moved along the horizontal axis. As mentioned above when the scanning pattern is stabilized the output of the integrator 38 will be zero volts.

Similarly the AND gates 125 and 126, the inverters 128 and 129 and the combining circuit 127 function to produce a resultant pattern of positive and negative pulses which are supplied to integrator 44 (FIG. 2) through a gating network to produce a d-c voltage whose polarity and magnitude determine the direction and the distance which the scanning pattern should be moved vertically in order to reach a stable condition.

During normal tracking operation before a break-lock occurs the flip-flop 64' is reset so that AND gate 62' is conductive and AND gate 63' is non-conductive. Thus the output from square wave generator 28' is supplied to the phase comparators 36' and 42' in a non-inverted form. However, when a break-lock occurs an appropriate signal is supplied via lead 85' from the control means 82 of FIG. 1 to set flip-flop 64', and thereby cause AND gate 62' to become non-conductive and AND gate 63' to become conductive. Consequently, the output from square wave generator 28' is supplied to 180° phase shifter 65' where it is inverted before being supplied to the phase comparators 36' and 42'. The system is now prepared to track a bright object upon a darker background.

In addition to inverting the polarity of the phase comparator reference signals (waveforms G and H of FIG. 5), the system must remember three factual parameters of the target which existed at the time break-lock occurred, in order to recapture the target image with the scanning pattern.

These three information parameters are as follows:
1. The direction of travel of the target.
2. The rate of velocity normal to the direction of sight.
3. The size of the nutation scanning pattern.

At the time of break-lock the second harmonic component, which is derived from the scanning pattern of the image reproducing tube, disappears since the scanning pattern is no longer locked upon the target. Consequently the d-c voltage ordinarily derived from such second harmonic and employed to control the size of the scanning pattern is also no longer present. Thus, unless appropriate circuit changes are made in the system, the voltage supplied to the input 196 of integrator 94' of FIG. 9 will tend to go towards zero and the output of the integrator 94' will tend to go towards negative infinity, thereby causing the scanning pattern to increase to a very large value.

To avoid the foregoing, AND gates 172 and 174 are caused to become non-conductive when break-lock occurs. More specifically, the break-lock disable pulse 159 generated by pulse generator 151 of FIG. 7 is caused to be supplied to the input of AND gates 172 and 174 of FIG. 9 immediately upon the occurrence of break-lock, thereby causing said AND gates 172 and 174 to become non-conductive and, in effect, to become open circuits. Thus, both the outputs from the harmonic filter 79 of FIG. 1 and the reference voltage $V_{ref}$ from FIG. 9 are disconnected from the input terminals of integrator 94'.

Shortly thereafter the nutation reduce pulse 161 generated by pulse generator 153 of FIG. 7 is supplied to input 195 of AND gate 194 to impress the voltage appearing across capacitor 193 upon the input 200 of operational amplifier 199. Since the voltage appearing across capacitor 193 is a measure of the size of the scanning pattern at the time break-lock occurs, the voltage appearing at the output of amplifier 182 will, as a result of the supplying of said capacitor 193 voltage to operational amplifier 199, cause the size of the scanning pattern to bear a predetermined relationship to its size immediately before break-lock.

In one form of the invention the logic of FIG. 9 is designed so that the size of the scanning pattern immediately after break-lock, and as a result of voltage across capacitor 193, will be approximately one-half the size of the scanning pattern immediately before break-lock.

Also, shortly after the break-lock disable pulse occurs but almost simultaneously therewith, the rate memory control pulse 162 of FIG. 7 is generated and functions to gate the output of the horizontal and vertical rate memories 69 and 70 of FIG. 1 into the combining circuits 39 and 45 of FIG. 2, in lieu of the output voltages of integrators 38 and 44.

The output signals of integrators 38 and 44 are each supplied into a logic circuit of the type shown in FIG. 11. It is to be understood that the system contains two of the type circuits shown in FIG. 11; one constituting the vertical rate memory and the other constituting the horizontal rate memory.

Assume for the purpose of discussion that the circuit shown in FIG. 11 represents the horizontal rate memory. The output of integrator 38 of FIG. 2 is supplied to amplifier 210 via lead 208 at all times except during the rate memory pulse 162 of FIG. 7. The output of amplifier 210 is supplied through isolating diode 212 into capacitor 214 which functions to accumulate a voltage potential thereon representative of the horizontal velocity of the target. From FIG. 11 it can be seen that INHIBIT AND gate 209 is conductive at all times except during the rate memory pulse 162 of FIG. 7.

When break-lock occurs the rate memory pulse 162 of FIG. 7 is supplied via input of lead 217 of FIG. 11 to open AND gate 213, thereby applying the voltage appearing across capacitor 214 back into the input of integrator 38.

Since both the horizontal and vertical components of velocity are memorized in separate rate memory circuits the direction of the target, as well as the velocity of the target, at the time break-lock occurs is remembered. The integrators 38 and 44 will continue to produce a d-c output voltage which ultimately is supplied to the vertical and horizontal deflection coils to cause the nominal center of the scanning pattern to follow the remembered path of the target.

Since most break-lock conditions occur as a result of the target suddenly reflecting the sunlight towards the image reproducing tube and thereby becoming a bright object on a dark background, recapture of the target is predicated upon changing the logic to detect a bright object upon the dark background. As discussed hereinbefore such change is logic is effective essentially by reversing the polarity of the horizontal and vertical deflection reference signals supplied to the phase comparators 36 and 42 of FIG. 1. Such reversal of polarity results in a reversal of the direction of forces acting upon the scanning pattern as it passes over the lighter areas, which have now become the target area.

More specifically, since the scanning electron beam will still produce a positive signal when a lighter area is being scanned the resultant output from said image reproducing tube is as shown in waveform J of FIG. 5. It can be seen that waveform J is substantially in inversion of waveform F. In this discussion it is assumed that the size and position of the scanning pattern with respect to the target are the same in both instances, i.e. before break-lock occurs, and also after the target has been recaptured as a bright object on a dark background.

Because of the reversal of phase of the horizontal and vertical deflection reference signals, as shown in waveform G and H, the resultant forces exerted upon the scanning pattern will be in a direction as to cause said scanning pattern to move towards the lighter area which is now the target.

Reference is made to the vector diagram of FIG. 13 which shows the force vectors $F_8$ through $F_{12}$ exerted upon the scanning pattern as a result of the generation of the pulses $P_8$, $P_9$, $P_{10}$, $P_{11}$ and $P_{12}$ of waveform J. It is to be noted that only a portion of the end pulse $P_8$ and $P_{12}$ are employed in formulating the vector diagram of FIG. 13 since only one complete period of nutation is employed in order to calculate the forces being exerted upon the scanning pattern.

As in the case of the vector diagram of FIG. 12 all of the d-c components supplied to the horizontal deflection coils must total to a value of zero, and all of the d-c components supplied to the vertical deflection coils must total to a value of zero in order to achieve a condition of stability of the position of said scanning pattern.

The size of the scanning pattern is again determined by the amplitude of the second harmonic generated as the electron beam passes between light and dark areas as discussed hereinbefore.

A fifth condition which is caused to exist upon break-lock is the energization of the automatic lock-on circuit 101 of FIG. 2. Such automatic lock-on circuit is basically a sine wave signal source having a frequency considerably less than the nutating frequency, but of considerably larger amplitude. The lock-on circuit 101 also contains means for attenuating said signal source inversely in accordance with the pulse 170' of FIG. 8. Thus the output of the automatic lock-on circuit 101 is a signal having a function sin X/X. Such signal is supplied to the vertical deflection plates through the combining circuit 45 and the vertical deflection amplifier 46. Such signal is also supplied to the horizontal deflection plates through a 90° phase shift means 102, combining circuit 39, and amplifier 40. The result of such signal being supplied to the horizontal and vertical deflection coils is to cause the nominal center of the nutating scanning pattern to follow a collapsing spiral path. It is to be remembered also, however, that the nominal center of the collapsing spiral is moving transversely in accordance with the remembered rate and direction of the target.

In FIG. 14 there is shown a representation of the path and size of the nutating beam beginning with a stable harmonic lock-on condition, followed by a break-lock condition with the collapsing spiral automatic lock-on path superimposed upon the reduced nutating scanning pattern. Next there is shown a simple lock-on to the target during the break-lock condition followed by the termination of break-lock disable pulse and the subsequent harmonic lock-on, with the size of the nutation scanning pattern gradually increasing back to a size approximately equal to what it was before break-lock occurred.

I – D — CONTROL LOGIC FOR ORIGINALLY INITIATING THE FINDING OF THE TARGET IMAGE AND ESTABLISHING BOTH SIMPLE AND HARMONIC LOCK-ON THEREOF. (FIGS. 1, 2, 7, 8, 9, and 10)

To initially energize the system the operator, i.e. the pilot of the aircraft, closes a switch which supplies an energizing pulse to input lead 157 of FIG. 7, thereby energizing only pulse generators 151 and 152. The pulse generator 151 generates the break-lock disable pulse whose function is to disconnect the threshold detector 81 of FIG. 1 from the control means 82 to permit the lock-on logic to function even though the output of the threshold detector 81 is near zero and, during stable operation, would initiate a break-lock condition.

The output of pulse generator 152 is pulse 160, which is identified herein as the nutation cage pulse. Such nutation cage pulse is supplied through diode 179 of FIG. 9 and resistor 180 to input terminal 196 of integrator 94'. The polarity of such nutation cage pulse is of a magnitude as to cause the size of the scanning pattern of the nutating beam to reduce to a minimum on the screen of the image reproducing tube 31 of FIG. 1.

It can be seen from FIG. 9 that the nutation caging pulse overrides any signals supplied from the output of the harmonic filter 79 of FIG. 1, which output is supplied via input lead 171 of FIG. 9, gate 172, and resistor 178 to the input 196 of integrator 94'. Consequently, for the duration of the nutation caging pulse the size of the scanning pattern is at its minimum, which is herein defined as the caged condition. However, immediately upon termination of said caging pulse the output of harmonic filter 79 of FIG. 1 will be supplied to input 196 of integrator 94' of FIG. 9, and the size of the scanning pattern will begin to grow in accordance with the parameter of the second harmonic lock-on logic as discussed hereinbefore.

It is to be noted specifically that during the initial start up phase of the operation, AND gates 172 and 174 both remain conductive throughout, so that the second harmonic lock-on logic becomes effective immediately upon termination of the nutation caging pulse.

Reference is made to FIG. 15 which shows a sketch of the path of the electron beam on the image reproducing screen during the initial start up operation. Point 181 represents that point in time when the operator closes the start operation switch and initiates generation of the break-lock signal, the ALO scan signal, and the nutation cage signal. The caged nutating electron beam follows a collapsing spiral pattern until it locks on upon the target at point 182, for example. From point 182 to point 184 the nutating beam follows the target in a simple lock-on condition. Then at point (time) 184 the caged nutation pulse is terminated and the harmonic lock-on logic becomes effective. Consequently, the size of the scanning pattern begins to increase until it reaches the size determined by the requirement of the second harmonic lock-on logic. As discussed hereinbefore such growth of the scanning pattern occurs during the period 185 as indicated in FIG. 15.

While the discussion throughout this specification has referred to the scanning pattern of the nutating electron beam as being circular in nature, it is to be specifically noted that such pattern also can be elliptical in nature, or some other geometric shape if desired.

FIG. 16 is a family of curves showing the relative magnitudes of the second harmonic developed by circular and elliptical scanning patterns. In FIG. 16 the Y coordinate represents the amplitude of the output of the harmonic filter and rectifier 79 of FIG. 1 and the X coordinate represents the contrast ratio, i.e., the ration of the brightness of the dark target body to the light background, or when the target reflects the sun the ratio of the dark background to the light target.

The pair of curves 250 and 251 represent, respectively, elliptical and circular scanning patterns when the nutating scanning pattern size is equal to the target size; the pair of curves 252 and 253 represent respectively the amplitude of the second harmonic generated by elliptical and circular scanning patterns when said scanning patterns are approximately one half the size of the target; and the pair of curves 254 and 255 represent the amplitude of the generated second harmonic when the scanning patterns are respectively twice the size of the target and four times the size of the target. There is no substantial difference in the magnitude of the second harmonic signal generated by elliptical scanning sizes are so much greater than the target size.

II — DESCRIPTION OF OPERATION OF THE SYSTEM

A — OPERATION DURING INITIAL START UP MODE

To initiate operation of the device the pilot of the aircraft maneuvers the aircraft so that the target image is caused to appear at the intersection of a set of cross hairs located on the screen of the television receiver 28 or other suitable fire control devices such as a sighting helmet, which receives the signal representing the target image from the image reproducing means 31. Once the target image is centered upon the cross-hair the pilot depresses an appropriate lock-on switch (not specifically shown in the drawings) which functions to apply a signal upon input lead 157 of FIG. 7 of the control circuit, to thereby energize pulse generators 151 and 152 and also to supply the trigger pulse to the ALO circuit 101 of FIG. 2. Thus, there is generated a break-lock disable pulse 159'', a nutation cage pulse 160', and the ALO scan pulse 170', which functions to create the collapsing spiral path of the nutating electron beam.

Due to the above-mentioned generated pulses the electron beam will follow the path shown in FIG. 15, and beginning at point 181. The path of the electron beam defines a nutating scanning pattern whose nominal center follows a collapsing spiral path. As discussed above, it is assumed the target is locked upon the electron beam at point 182, from which point the nutating scanning pattern of the electron beam will follow the target. At point 184 the nutation cage control pulse terminates and the nutating scanning pattern is permitted to grow to a size determined by the amplitude of the second harmonic generated as the electron beam cuts across the dark and light portions of the target and background, respectively. This second harmonic is detected and rectified by the filter and rectifier 79 of FIG. 1 and is supplied to an integrator 94 of FIG. 1 which generates a d-c voltage which in turn is supplied to the nutating generating and control means 90 which functions to control the size of the nutating scanning pattern in accordance with a reference voltage $V_{ref}$ as shown in FIG. 10. Should the d-c voltage from integrator 94 become more negative than $V_{ref}$ the nutation control means 90 will function to reduce the size of the scanning pattern as discussed hereinbefore, and in accordance with the logic of FIG. 9. Should the d-c output from integrator 94 be less negative than $V_{ref}$ of FIG. 10, then the logic of FIG. 9 will cause the size of the nutating scanning pattern to increase until the d-c component of the rectified second harmonic output from rectifier 79 of FIG. 1 is substantially equal to the voltage reference $V_{ref}$ of FIG. 10.

II – B — OPERATION DURING STEADY STATE OPERATING MODE

During the steady state operating mode the logic of FIG. 9 will function to maintain the size of the nutating scanning pattern such that the second harmonic generated as the scanning pattern passes between the light and dark areas, defined by the background and the target, will have a rectified value which remains near the reference voltage $V_{ref}$, as discussed in detail hereinbefore in connection with the logic of FIG. 9.

During simple lock-on the scanning pattern can move freely about the dark body of the target and phase comparators 36 and 42 function to compare the phases of the pulses generated by the scanning pattern as it passes between the light areas of the background and the dark target, with the quadature phased reference signals whose phases correspond to the phases of the sine and cosine function signals which drive the vertical and horizontal deflection coils. The d-c voltages produced by the phase comparators 36 and 42 are supplied back to the horizontal and vertical deflection coils to cause the scanning pattern of the electron beam to follow the target.

The horizontal and vertical rate memories 69 and 70 function to maintain a continuously updated record of the d-c voltages supplied back to the vertical and horizontal deflection coils so that tracking can continue even if a break-lock occurs.

It is to be specifically noted that during steady state operation none of the pulses shown in FIG. 8 are generated, and in fact there are no pulses produced by the control means 82 of FIG. 1, which control means is shown in more detail logic form in FIG. 7.

In the event that a break-lock occurs, as for example if the target should suddenly reflect the rays of the sun towards the image reproducing tube and the target is lost temporarily, certain logic means which has been discussed in detail hereinbefore is energized to recapture the target, as summarized below.

III – D — OPERATION DURING BREAK-LOCK MODE AND RECAPTURE OF TARGET

When the target suddenly assumes a position whereby it reflects the sunlight to the image reproducing tube and becomes a light object upon a dark background, the scanning pattern is forced off the target and onto the background, thereby effectively losing the target. A similar loss of target can occur should the target pass behind a cloud, for example.

Immediately upon loss of target the second harmonic component ordinarily produced as a result of the scanning pattern passing between the light and dark areas of background and target drops to a zero value. Thus the output of the harmonic filter and rectifier 79 of FIG. 1 also drops to a near zero value and more specifically drops below the threshold voltage $V_{th}$ of FIG. 10. The threshold detector 81 of FIG. 1 functions to detect the decrease of the d-c output of rectifier 79 to a value below $V_{th}$ and produces an output pulse through AND gate 8 to the control means 82.

Referring to FIG. 7, which shows a more detailed logic diagram of the control circuit, such pulse is supplied to the pulse generator 150, the output of which functions inturn to energize pulse generators 151, 153 and 154. The pulse generators 151, 153, and 154 generate, respectively, the break-lock disable pulse 159, the nutation reduce pulse 161, the rate memory control pulse 162, the output of pulse generator 150 also functions to produce a polarity reversal pulse 158 and the ALO trigger pulse. These five pulses are also shown in FIG. 8 under the title Break-Lock Occurrence.

The polarity reversal pulse 158 functions to reset the flip-flop 64 of FIG. 1 to reverse the phases of the two reference signals supplied to phase comparators 36 and 42 so that, in effect, the d-c voltage components appearing at the outputs of phase comparators 36 and 42 will tend to push the scanning pattern off the dark background and onto the now lighter area of the target, as opposed to the condition described above when the target was a dark background upon a light background.

Referring to FIG. 14 the steady state operation is shown as occurring during the bracketed period 175, with target loss occurring at point 176, at which time the break-lock disable pulse is generated as well as the other four pulses 158, 160, 161, and 162 shown in FIG. 8. The ALO trigger pulse is also generated on output lead 168 to energize the ALO logic 101 of FIG. 1.

The nutation reduce pulse 161 functions to reduce the size of the nutation scanning pattern to approximately one-half the size it was immediately before break-lock occurred. The logic for accomplishing the nutation reduce function is shown in FIG. 9 and essentially involves the opening of AND gate 194 by the application of the nutation reduce control pulse 161' (FIG. 8) to the input 195 of said AND gate 194. The charge on capacitor 193, which represents a voltage which will maintain the size of the scanning pattern at the reduced size, is then supplied through AND gate 194 to the input 196 of integrator 94', as discussed in detail hereinbefore.

Again referring to FIG. 14, the reduced scanning pattern size is shown beginning at time 177. Since the automatic lock-on logic 101 of FIG. 2 is also energized at this time, and represented by the automatic lock-on spiral scan control signal 170' of FIG. 8, the path of the nutating electron beam will follow a collapsing spiral with the nominal center of the spiral moving along the remembered path of the target.

The remembered path of the target is obtained by means of the horizontal and vertical rate memories 69 and 70 of FIG. 1, both of which are represented by the single logic diagram of FIG. 11. The voltage accumulated across a capacitor, such as capacitor 214, during steady state operation, represents the horizontal or vertical rate of the target.

The voltages across the rate memory capacitors, such as capacitor 214, are supplied in parallel to integrators 38 and 44 of FIG. 2, and then through summers 39 and 45, amplifiers 40 and 46, and then back to the vertical and horizontal reflection coils to cause the nominal center of the spiral scan of FIG. 14 to continue to move in the last remembered direction of the target and with the last remembered velocity.

At point 178 in FIG. 14 assume that a simple lock-on to the target is effected. It will be recalled that simple lock-on occurs when the nutating beam locks upon and within the target, which is now a light body upon a dark background. However, since the size of the nutation has been reduced it is unlikely that a second harmonic will be generated. The size of the scanning pattern is still fixed by the nutation size control pulse 161 of FIG. 7 and the logic of FIG. 9, which is controls now thereby. At time 179 in FIG. 14 the nutation size control pulse terminates and the size of the scanning pattern is permitted to grow during the period 18, as indicated in FIG. 14. Such scanning pattern will continue to grow upon the target until it cuts across sufficient arcuate portions of the dark background to produce a second harmonic component which will satisfy the logic of FIG. 9, and more specifically will produce a d-c component from the rectified form of second harmonic which is substantially equal to the reference voltage $V_{ref}$.

The operating condition has now again become stable and will continue to operate as long as the target remains a light object upon a dark background however. Should the target shift position again so that it will again become a dark body upon a light background and another break-lock will occur.

The conditions existing during this second break-lock, and the means for recapture are identical to those described above except for one difference. The polarity reversal pulse of FIG. 8 will again be generated but this time it will cause the single input flip-flop 64 of FIG. 1 to become reset, thus again reversing the phases of the two reference signals supplied to the horizontal and vertical deflection phase comparators 36 and 42. The said two reference signals will again have the form shown in waveforms C and D of FIG. 5.

It is to be understood that the form of the invention shown and described herein is but a preferred embodiment thereof and that various changes may be made in the logic arrangement, both general and specific, without departing from the spirit or scope of the invention.

What is claimed is:

1. Tracking means constructed to track a moving target and comprising:

image reproducing means comprising a screen and constructed to optically project the image of said target and the background thereof upon said screen;

said screen responsive to a beam of charged particles to generate electrical signals whose amplitude varies in accordance with the intensity of the light being projected upon said screen;

scanning means comprising a beam of charged particles, a vertical deflecting means for deflecting said beam vertically, and a horizontal deflecting means for deflection said beam horizontally;

means for supply first signals to said vertical and horizontal deflecting means to cause said beam to describe a nutating scanning pattern at a predetermined nutation rate;

starting means for initially causing said nutating scanning pattern to lock-on upon said target image;

first control means responsive to the impingement of said beam upon portions of said screen outside said target image to supply to said horizontal and vertical deflecting means signals of a polarity and a magnitude to deflect said beam so that said nutating scanning pattern will tend to remain within said target image when said target image is of a different brightness than said background;

second control means responsive to that component of the signal, generated by said beam as it impinges alternately upon said target image and upon portions of said screen outside said target image, whose frequency is equal to a given harmonic of the nutation rate, to cause said nutating scanning pattern to increase in size until said given harmonic signal component reaches a predetermined amplitude.

2. Tracking means in accordance with claim 1 and further comprising:

rate memory means for continuously recording a second signal representative of the direction and velocity of said target image upon said screen;

nutation scanning pattern size memory means for continuously recording a third signal representative of the scanning pattern size; and logic control means responsive to the loss of lock-on of said nutating scanning pattern upon said target image to connect the second signal of said rate memory means and the third signal of said nutation scanning pattern size memory means to said vertical and horizontal deflecting means to cause the nominal center of said scanning pattern to follow the remembered path of said target image at the remembered velocity and to regain lock-on of said scanning pattern upon said target image.

3. Tracking means in accordance with claim 1 and further comprising:

rate memory means for continuously recording a second signal representative of the direction and velocity of said target image upon said screen;

nutation scanning pattern size memory means for continuously recording a third signal representative of the nutation scanning pattern size;

automatic lock-on scanning means constructed to cause the nominal center of the nutating scanning pattern to follow a collapsing spiral pattern; and logic control means responsive to a loss of lock-on of said nutating scanning pattern upon said target image to connect said rate memory means, said nutation scanning pattern size memory means, and said automatic lock-on scanning means to said vertical and horizontal deflecting means to cause the nominal center point of said nutating scanning pattern to follow a path defined by said collapsing spiral pattern with the nominal center of said collapsing spiral being translated along the remembered path of said target image and with the remembered velocity of said target image, and to regain lock-on of said scanning pattern upon said target image.

4. Tracking means in accordance with claim 2 in which said first control means further comprises:

polarity reversing means responsive to loss of lock-on upon said target image by said scanning pattern to condition said first control means to deflect said electron beam so that said nutation scanning pattern tends to remain within said target image with the relative brightnesses of said target image and the portions of said screen surrounding said target being reversed.

5. Tracking means constructed to track a moving target and comprising:

a screen constructed to assume different energy states in response to images optically projected thereon and to be responsive to an impinging electron beam to generate a signal whose amplitude varies in accordance with the energy level of that portion of the screen upon which the electron beam is impinging;

means for projecting the image of said target upon said screen;

scanning means comprising an electron beam and deflecting means for deflecting said electron beam in vertical and horizontal directions;

means for supplying first signals to said deflecting means to cause said electron beam to describe a nutating scanning pattern upon said screen;

starting means for initially establishing lock-on of said nutating scanning pattern upon said target image;

first control means responsive to the impingment of said electron beam upon a portion of said screen outside said target image to supply a second signal to said deflecting means to deflect said electron beam so that said nutating scanning pattern tends to remain within said target image; and second control means responsive to a signal component of a given frequency which is generated by said electron beam as it scans alternately between portions of the target image and portions of the screen outside said target image, to cause said nutating scanning pattern to increase in size until said signal component reaches a predetermined amplitude.

6. Tracking means in accordance with claim 5 and further comprising:

rate memory means for continuously recording a second signal representative of the direction and velocity of said target image upon said screen;

nutation scanning pattern size memory means for continuously recording a third signal representative of the scanning pattern size; and logic control means responsive to the loss of lock-on of said nutating scanning pattern upon said target image to connect the second signal of said rate memory means and the third signal of said nutation scanning pattern size memory means to said electron beam deflecting means to cause the nominal center of said scanning pattern to follow the remembered path of said target image at the remembered velocity and to regain lock-on of said scanning pattern upon said target image.

7. Tracking means in accordance with claim 5 and further comprising:

rate memory means for continuously recording a second signal representative of the direction and velocity of said target image upon said screen;

nutation scanning pattern size memory means for continuously recording a third signal representative of the nutating scanning pattern size;

automatic lock-on scanning means constructed to cause the nominal center of the nutating scanning pattern to follow a collapsing spiral pattern; and logic control means responsive to a loss of lock-on of said nutating scanning pattern upon said target image to connect said rate memory means, said nutation scanning pattern size memory means and said automatic lock-on scanning means to said electron beam deflecting means to cause the nominal center point of said nutating scanning pattern to follow a path defined by said collapsing spiral pattern with the nominal center of said collapsing spiral being translated along the remembered path of said target image and with the remembered velocity of said target image, and to regain lock-on of said scanning pattern upon said target image.

8. Tracking means in accordance with claim 7 in which said first control means further comprises:
  polarity reversing means responsive to loss of lock-on upon said target image by said scanning pattern to condition said first control means to deflect said electron beam so that said nutation scanning pattern tends to remain within said target image with the relative brightnesses of said target image and the portions of said screen surrounding said target image being reversed.

* * * * *